United States Patent
Smith

(10) Patent No.: US 12,182,031 B2
(45) Date of Patent: Dec. 31, 2024

(54) COMPUTER SYSTEM AND METHOD USING A FIRST PAGE TABLE AND A SECOND PAGE TABLE

(71) Applicant: Imagination Technologies Limited, Kings Langley (GB)

(72) Inventor: Christopher Smith, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/691,358

(22) Filed: Mar. 10, 2022

(65) Prior Publication Data
US 2022/0334978 A1   Oct. 20, 2022

(30) Foreign Application Priority Data

Mar. 10, 2021 (GB) ...................................... 2103329

(51) Int. Cl.
*G06F 12/1009* (2016.01)

(52) U.S. Cl.
CPC .... *G06F 12/1009* (2013.01); *G06F 2212/651* (2013.01)

(58) Field of Classification Search
CPC .................. G06F 12/1009; G06F 2212/651
See application file for complete search history.

(56) References Cited

U.S. PATENT DOCUMENTS

| | | | |
|---|---|---|---|
| 8,516,221 B2 | 8/2013 | Thelen et al. | |
| 11,954,026 B1* | 4/2024 | Kaplan | G06F 9/45558 |
| 2006/0161719 A1* | 7/2006 | Bennett | G06F 9/45558 |
| | | | 711/6 |
| 2014/0156968 A1* | 6/2014 | Terry | G06F 12/1009 |
| | | | 711/207 |
| 2014/0331023 A1* | 11/2014 | Sharp | G06F 12/1009 |
| | | | 711/206 |
| 2020/0065255 A1 | 2/2020 | LeBeane et al. | |
| 2020/0133773 A1 | 4/2020 | Lingarajappa | |
| 2020/0174945 A1 | 6/2020 | Mukherjee et al. | |

* cited by examiner

*Primary Examiner* — Chie Yew
(74) *Attorney, Agent, or Firm* — Potomac Law Group, PLLC; Vincent M DeLuca

(57) ABSTRACT

A computer system includes a physical memory having a first page table and a second page table, and an address translation module. The first page table includes primary page table entries, where each page table entry among the primary page table entries is configured to store a mapping of a virtual memory address to a physical memory address and auxiliary information. The second page table includes secondary page table entries each storing at least one further auxiliary information, where each secondary page table entry corresponds to a primary page table entry in the first page table. The address translation module is configured to, in response to receiving a request from a processor, walk through the first page table to identify a primary page table entry and consecutively identify a location of a corresponding secondary page table entry based on a location of the primary page table entry.

15 Claims, 9 Drawing Sheets

FIG. 2D

| 31 | 22 21 | 12 11 | 0 |
|---|---|---|---|
| VPN | VPN | Page offset | |

FIG. 2E

| 33 | 22 21 | 12 11 | 0 |
|---|---|---|---|
| PPN | PPN | Page offset | |

FIG. 2F

| 31 | 20 19 | 10 9 | 8 | 7 | 6 | 5 | 4 | 3 | 2 | 1 | 0 |
|---|---|---|---|---|---|---|---|---|---|---|---|
| PPN | PPN | RSW | D | A | G | U | X | W | R | V | |

FIG. 2G

| 63 | 54 53 | 28 27 | 19 18 | 10 9 | 8 | 7 | 6 | 5 | 4 | 3 | 2 | 1 | 0 |
|---|---|---|---|---|---|---|---|---|---|---|---|---|---|
| Reserved | PPN | PPN | PPN | RSW | D | A | G | U | X | W | R | V | |

COMPUTER SYSTEM AND METHOD USING A FIRST PAGE TABLE AND A SECOND PAGE TABLE

TECHNICAL FIELD

The application relates to page tables in a computer system.

BACKGROUND

Memories store information for use in a computer system or computer hardware devices. Many computational tasks undertaken by a computer system require large amounts of memory and hence program code and data to be accessed by a processor are normally stored in a main memory (or physical memory) of the computer system. The main memory stores the program code and data in a plurality of locations within the main memory. Each memory location is addressable by a physical address which is an identifier of that location to the system. The identifier maybe thereafter used to access the corresponding memory location in the main memory when running a program or accessing a data.

Today, with modern operating systems, computer systems are enabled to use the feature of virtual memory. Virtual memory is a concept of ideal abstraction of memory resources in the computer system. The main benefit of using virtual memory includes freeing applications from having to manage a shared memory space, increased security, and being able to conceptually use more memory than what might be physically available. The computer system comprises hardware units such as a memory management unit coupled to the processor performing memory translation from virtual address to physical address. A memory management unit uses a memory map such as a page table to hold the translation of virtual addresses seen by an application into physical addresses of the physical memory. Typically, the memory map stores the address translation and a plurality of memory attributes of the corresponding physical address accessed by the application. Memory attributes are characteristics of memory which are used to identify the way in which the memory works. Examples of the memory attributes include but are not limited to readability, writability, cacheability, shareability and the like.

When independently developing a CPU architecture, it is possible to redefine the format of entries in the page table at will and hence newly desired memory attributes could be included in the page table. However, in some of the open standard instruction set architectures, it is not so easy to redefine the format of the entries in the page table. In such cases, the format of a page table provided by the standard may not provide all the features, in particular may not define all the necessary memory attributes, to allow more complex applications to operate as desired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect there is provided a computer system comprising a physical memory comprising a first page table and a second page table, and an address translation module. The first page table comprise primary page table entries, wherein each page table entry among the primary page table entries is configured to store a mapping of a virtual memory address to a physical memory address and auxiliary information and the second page table comprising secondary page table entries each storing at least one further auxiliary information, wherein each secondary page table entry corresponds to a primary page table entry in the first page table. The address translation module is configured to, in response to receiving a request from a processor, walk through the first page table to identify a primary page table entry and consecutively identify a location of a corresponding secondary page table entry based on a location of the primary page table entry.

Optionally, each secondary page table entry is stored in the physical memory at a pre-determined offset from the corresponding primary page table entry.

Optionally, the address translation module is further configured to retrieve the primary page table entry and the secondary page table entry.

Optionally, the address translation module comprises the cache configured to store a plurality of address translations, each from a virtual memory address to a physical memory address and optionally the cache is a translation look aside buffer (TLB).

Optionally, the address translation module on receiving a request, that is a virtual address, is configured to: search, in the cache, for valid address translation from the virtual address to a physical address; provide the physical address to the processor, on identifying the valid address translation for the virtual address in the cache; and invoke a cache miss, in the absence of the valid address translation in the cache.

Optionally, the address translation module walks through the first page table to retrieve the primary page table entry comprising a mapping of a physical address to the virtual address, on the occurrence of the cache miss.

Optionally, the auxiliary information and the further auxiliary information comprises one or more memory attributes.

Optionally, the address translation module further copies the primary page table entry and the corresponding secondary page table entry retrieved into the cache.

Optionally, the invoking of the cache miss is handled by the address translation module by using a page table walker.

Optionally, the invoking of the cache miss is handled by the address translation module by raising a software exception handler.

Optionally, the address translation module is configured to calculate the location of the corresponding secondary page table entry using the predetermined offset while accessing the valid primary page table entry in the first page table.

Optionally, the second page table is stored in the physical memory at a location physically contiguous to the first page table.

Optionally, the second page table is stored in the physical memory at a location not physically contiguous to the first page table.

Optionally, the second page table is of a same size as the first page table, with primary and secondary page table entries having the same bit length.

Optionally, the predetermined offset is a predetermined fixed offset with each secondary page table entry being stored in the physical memory at a fixed same offset from the corresponding primary page table entries.

Optionally, the second page table is of a different size compared to the first page table, with secondary page table entries having a different bit length compared to the corresponding primary page table entries.

Optionally, the predetermined offset is a predetermined variable offset with each secondary page table entry stored in the physical memory at a different offset from the corresponding primary page table entry.

Optionally, the processor is a 32-bit RISC-V processor.

Optionally, each primary page table entry comprises a predetermined number of bits which are all utilised.

According to a second aspect, there is a provided a computer implemented method performed by an address translation unit in a computer system, the computer system comprising a physical memory comprising a first page table comprising primary page table entries and a second page table comprising secondary page table entries, each secondary page table entry corresponds to a primary page table entry in the first page table, the computer implemented method comprises: receiving a request from a processor; walking through the first page table to identify a primary page table entry; and consecutively identifying location of a corresponding secondary page table entry based on the location of the primary page table.

Optionally, each secondary page table entry is stored in the physical memory at a pre-determined offset from the corresponding primary page table entry.

Optionally, the method further comprises retrieving the primary page table entry and the secondary page table entry.

Optionally, the method further comprises storing plurality of address translations, each from a virtual memory address to a physical memory address in a cache.

Optionally, the method further comprises, on receiving a request from the processor, where the request is a virtual address: searching, in the cache, for valid address translation from the virtual address to a physical address; provide the physical address to the processor, on identifying the valid address translation for the virtual address in the cache; and invoke a cache miss, in the absence of the valid address translation in the cache.

Optionally, the method comprising walking through the first page table to retrieve the primary page table entry comprising a mapping of a physical address to the virtual address, on the occurrence of the cache miss.

Optionally, the method comprising consecutively retrieving the corresponding secondary page table entry to identify at least one further auxiliary information.

Optionally, the method comprising determining the location of the corresponding secondary page table entry using the predetermined offset while accessing the valid primary page table entry in the first page table.

According to a third aspect, there is a provided a computer readable code configured to cause the method according to the second aspect to be performed when the code is run.

According to a fourth aspect, there is a provided a computer readable storage medium having encoded thereon the computer readable code according to the third aspect.

The computer system may be embodied in hardware on an integrated circuit. There may be provided a method of manufacturing, at an integrated circuit manufacturing system, a computer system. There may be provided an integrated circuit definition dataset that, when processed in an integrated circuit manufacturing system, configures the system to manufacture a computer system. There may be provided a non-transitory computer readable storage medium having stored thereon a computer readable description of a computer system that, when processed in an integrated circuit manufacturing system, causes the integrated circuit manufacturing system to manufacture an integrated circuit embodying a computer system.

There may be provided an integrated circuit manufacturing system comprising: a non-transitory computer readable storage medium having stored thereon a computer readable description of the computer system; a layout processing system configured to process the computer readable description so as to generate a circuit layout description of an integrated circuit embodying the computer system; and an integrated circuit generation system configured to manufacture the computer system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 2D illustrates a format of a virtual address in a 32 bit RISC-V (RV32) system;

FIG. 2E illustrates a format of a physical address in a 32 bit RISC-V (RV32) system;

FIG. 2F illustrates a format of a page table entry in a 32 bit RISC-V (RV32) system;

FIG. 2G illustrates a format of a page table entry in a 64 bit RISC-V (RV64) system;

Figure 1:
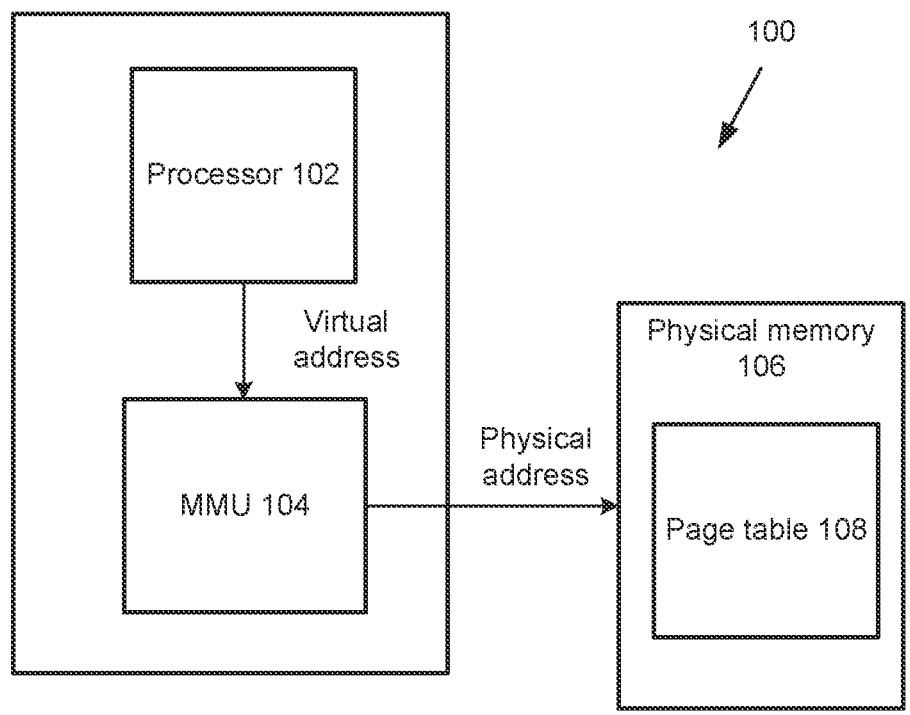
FIG. 1 is a block diagram of a computer system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 is a block diagram of a computer system 100. The computer system 100 comprises a processor 102, and a main memory (or a physical memory) 106. The processor 102 comprises a memory management unit (MMU) 104 coupled to it. The MMU 104 may be implemented using hardware or a hardware in combination with a software. The processor 102 runs an operating system comprising memory management techniques such as virtual memory. The operating system manages the main memory 106 and the virtual memory in groups of bytes known as pages. Pages make it easier to manage the whole memory effectively. Each page may be typically 4 kilobytes (KiB) or 8 KiB of memory. In a 32-bit system, it is possible to address at most $2^{32}$ different addresses. Each virtual page comprises a range of virtual addresses. Each physical page comprises a range of physical addresses. Virtual pages are then mapped to physical pages in the main memory.

Initially, when an application runs on the computer system 100, a program having instructions such as memory load or store instructions may be executed by the processor 102. The data from the instructions (or program) are stored in physical addresses in one or more physical pages in the main memory 106. The operating system running on the processor 102 makes and manages memory mappings between physical addresses and virtual addresses in one or more virtual pages and stores the memory mappings using data structures such as page table 108. The page table 108 comprises a plurality of entries known as page table entries. Each page table entry holds the mapping of a virtual address to the corresponding physical address in a physical page in the main memory 106.

There are different types of page tables optimized for different requirements. The different types of page table include inverted page tables, multi-level page table, nested page table, and virtualized page tables.

By using virtual memory, the operating system gives an application the impression that a large contiguous section of main memory 106 is used. However, in reality, the physical memory used by the application would be dispersed across different areas of the main memory or even paged out or moved to disk drives or solid-state drives. Later, when the application tries to access a virtual page, the corresponding virtual address is translated into an actual physical address, and the data is read from or written to the main memory 106.

When the application requests access to data in the memory, the operating system maps the virtual address to the corresponding physical address. The processor 102 provides a virtual address to be translated to the memory management unit 104. The MMU 104 translates the virtual address to a corresponding physical address in the main memory 106 and enables the processor to fetch the required data.

A more detailed explanation of working of the MMU 104 is provided in the below paragraphs with reference to FIG. 3. To understand this better FIG. 2A to 2C illustrates the format of a virtual address, a physical address and a page table entry (PTE)

Figure 2A:
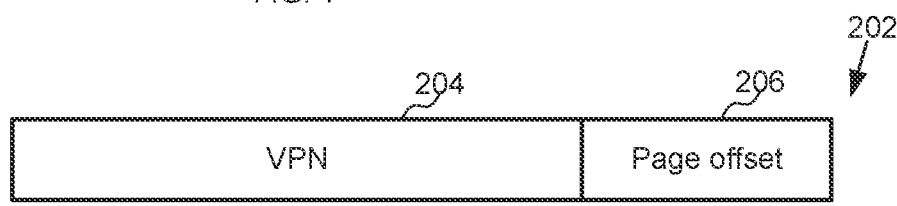
FIG. 2A illustrates a format of a virtual address.
Figure 2B:
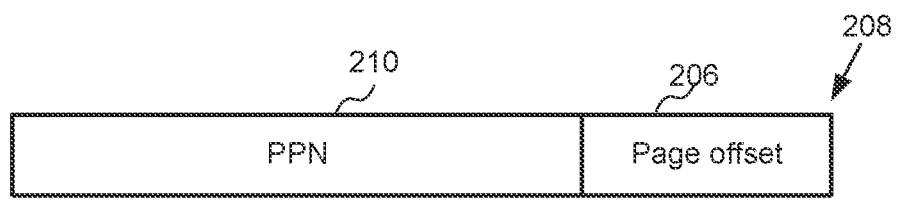
FIG. 2B illustrates a format of a physical address.
Figure 2C:
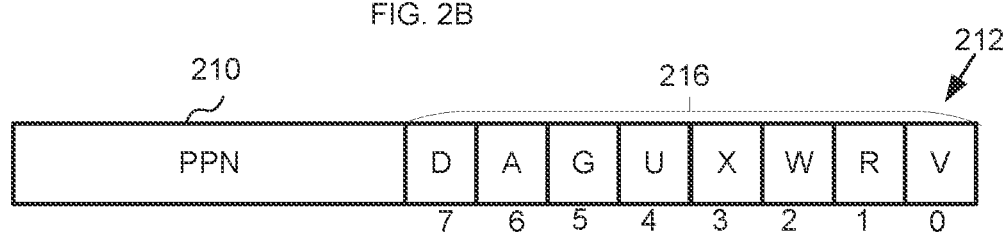
FIG. 2C illustrates a format of a page table entry.

FIGS. 2A and 2B show an example of a virtual address and a physical address respectively. FIG. 2A represents the format of a virtual address 202. The virtual address 202 comprises a virtual page number (VPN) 204 and a page offset 206. The VPN 204 is the virtual page to which the virtual address belongs. The location of the virtual address, in the virtual page, is at an offset dictated by the page offset from the start of the virtual page.

FIG. 2B illustrates the format of a physical address 208. Consider that the physical address 208 is the corresponding translated address obtained when the virtual address 202 is translated. The physical address 208 comprises a physical page number (PPN) 210 and the page offset 206. This means that physical address 208 belongs to the physical page represented by PPN 210 and is located in the physical page at an offset dictated by the page offset 206 from the start of the corresponding physical page. The virtual address 202 may be represented by a bit length larger than the bit length of the physical address 208 as there could be more virtual pages than the number of physical pages.

As mentioned with reference to FIG. 1, the MMU 104 coupled to the processor 102 translates the virtual address to the physical address. The MMU 104 uses an in-memory table called a page table for storing the mapping of virtual address to physical address. The page table is typically the size of a memory page, such as 4 KiB or 8 KiB. The page table comprises a plurality of page table entries (PTEs), each mapping a virtual page to a physical page in the main memory.

FIG. 2C illustrates an example format of a page table entry in a page table. The page table entry (PTE) 212 comprises a first number of bits 210 representing a page number and a second number of bits 216 representing auxiliary information. This format is just an example to aid the understanding, but it is obvious that a PTE can have different formats some of which are provided with reference to FIGS. 2F and 2G. When the processor 102 receives a virtual address as a request, the MMU 104 identifies a valid page table entry. A valid PTE corresponding to a virtual address comprises the physical page number in which the corresponding physical address is present as the page number 210. The page number 210 in a valid PTE along with the page offset of the virtual address provides the associated physical address.

Figure 3:
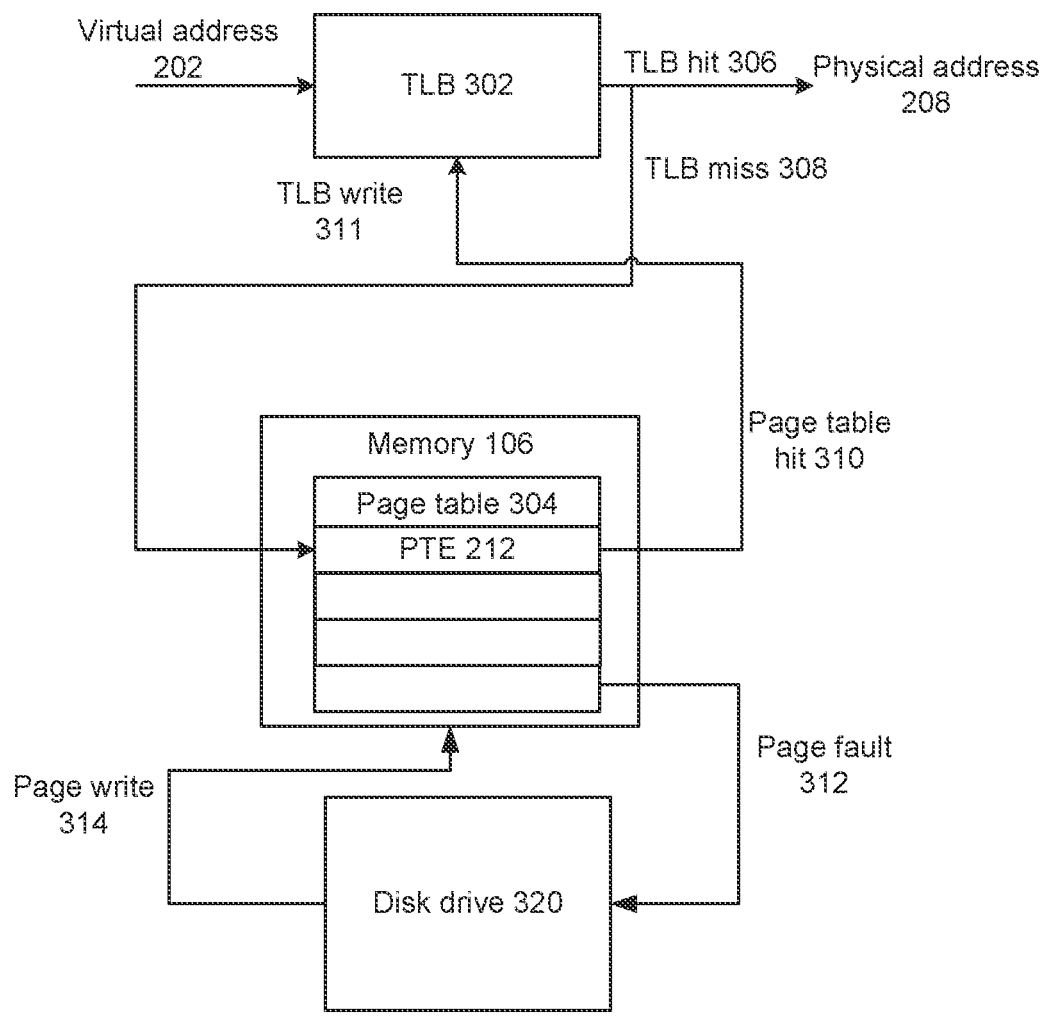
FIG. 3 illustrates the working of the memory management unit translating the virtual address to a physical address.

FIG. 3 illustrates the working of the MMU 104 translating the virtual address to a physical address. The MMU can be implemented using a dedicated hardware unit, or a hardware in combination with a software. The MMU 104 comprises a cache known as a translation lookaside buffer (TLB) 302. Further a page table 304 comprising a plurality of PTEs is stored in the main memory 106. The TLB 302 stores the recently used address translations (or PTEs) from the page table 304. Although the TLB temporarily stores some of the PTEs, it does not store them all, instead acting like a cache. As such, it would be evident for a person skilled in the art that a TLB is not itself a page table. As explained earlier, the operating system manages the main memory and the virtual memory in groups of bytes known as pages and stores the address translations between are the physical address and the virtual address in a translation table in the main memory known as the page table 304. The pages pushed out of the main memory may be stored in other storage devices such as disk drives 320.

The MMU 104 receives the virtual address 202 to be translated from the processor 102. The MMU first checks the TLB 302 to identify if a valid address translation comprising a physical address corresponding to the virtual address received is found. If the valid address translation corresponding to the virtual address is found, the MMU provides the translated physical address back to the processor 102. This is very fast as the TLB acts as a cache and the physical address is retrieved quickly and provided back to the processor.

If the physical address is not found in the TLB 302, a TLB miss 308 is invoked. When a TLB miss 308 is invoked the MMU may handle the TLB miss 308 using either a dedicated hardware or software.

A dedicated hardware for handling a TLB miss 308 may be known as a page table walker. Similarly, software for handling the TLB miss 308 may be known as a software exception handler. For the sake of simplicity, below, the description refers to a 'page table walker' and 'walking' the page table, but it will be understood that these features could be implemented by a software exception handler too.

On the occurrence of TLB miss, the page table walker walks through each page table entry in the page table 304 in the main memory and checks for a valid page table entry.

Returning to the examples shown in FIG. 2A to 2C, recall that the page table comprises multiple PTEs 212. Each PTE 212 comprises (a different) PPN 210. The page walker is looking for the particular (valid) page table entry corresponding to the particular virtual address that has triggered the TLB miss. The valid page table entry will contain a particular PPN 210, that can then be used to construct the physical address corresponding to the original virtual address. Therefore, the page table walker walks through the PTEs 212 in the page table 304 to identify the particular PTE required. If the particular PTE is found, this is termed as a page table hit 310. The PPN from the particular PTE and the page offset from the received virtual address is combined to form the translated physical address 208. The PTE 212 identified is further copied to the TLB 202, known as a TLB write 311.

If the valid PTE 212 is not found in the page table 304, then a page fault 312 command is invoked. When a page fault is invoked, the operating system may create a valid page table entry by copying the page to the main memory from another memory such as the disk drive, or handle the case a failure. Once the required page is written to the main memory 106, the page table 304 and the TLB is updated. This is known as a page table write 314.

Each PTE in the page table 304 further comprises a number of bits (such as the second number of bits 216 of PTE 212) comprising auxiliary information such as a plurality of memory attributes. Some of the memory attributes provided as auxiliary information may include present/absent, protection, referenced, caching etc. A present or absent bit indicates whether a particular page is present or absent. If the page is not present, that is known as a Page Fault. The present or absent bit is set to 0 if the corresponding page is not in memory. Protection bits indicate the kind of protection of the page, for example read, write etc. A referenced bit indicates whether this page has been accessed or not. For example, the referenced bit is set to 1 by hardware when the page is accessed. A caching bit indicates whether caching of the page is enabled or disabled.

As described earlier, the main memory 106 is divided into groups of bytes known as pages. The memory attributes are characteristics ascribed to each page in the main memory 106. While obtaining the physical address to be accessed, the processor also obtains the memory attributes associated with the page or the physical address to be accessed. The memory attributes specify how the memory page works.

Many widely used Instruction Set Architectures (ISAs) in computer systems such as MIPS®, ARM®, PowerPC® etc are proprietary to certain companies and hence it is possible for those companies to redefine the bits representing the plurality of memory attributes according to their needs when the ISA is developed.

Open-source software and open standard ISAs are an alternative to proprietary systems. However, open standard ISAs have their own limitations. Examples of open standard ISAs include OpenRISC®, SPARC®, RISC-V®, and the like. In open standard ISAs such as RISC-V processors, the format of the PTE in the page table is fixed by the standard. It is not possible for individual developers to redefine the PTE as desired, as this risks breaking compatibility with other applications from the ISA ecosystem. Further, different developers may have different requirements, meaning it can be difficult or impossible to agree changes to the format of the PTE. In any case, even in systems with developer freedom, the PTE is of limited size and so may not have space to include all the memory attributes that would be desired.

A RISC-V hardware platform in general can contain one or more RISC-V-compatible processing cores together with other non-RISC-V-compatible cores, fixed-function accelerators, various physical memory structures, I/O devices, and an interconnect structure to allow the components to communicate. The basic 32-bit RISC-V processor comprises a 32-bit processor architecture with 32 general-purpose registers. The 32-bit RISC-V system can be operated in different modes such as a machine mode, a user mode or a supervisor mode. When using the supervisor mode (Sv32) in the 32-bit RISC-V system, the supervisor operates in a 32-bit paged virtual-memory system. In this mode, supervisor and user virtual addresses are translated into supervisor physical addresses by traversing a radix-tree page table. Sv32 implementations support a 32-bit virtual address space, divided into 4 KiB pages.

FIGS. 2D and 2E show the virtual address and the physical address of a page based 32-bit RISC-V system. FIG. 2D shows an Sv32 virtual address 220 partitioned into a virtual page number (VPN) and page offset. When Sv32 virtual memory mode is selected in the MODE field of a Supervisor Address Translation and Protection register (satp) register, supervisor virtual addresses are translated into supervisor physical addresses via a two-level page table. The 20-bit VPN is translated into a 22-bit physical page number (PPN), while the 12-bit page offset is untranslated. FIG. 2E shows the translated physical address 225. The resulting supervisor-level physical addresses are then checked using any physical memory protection structures before being directly converted to machine-level physical addresses.

FIGS. 2F and 2G represent the format of a page table entry in a 32-bit RISC-V (RV32) system and a 64-bit RISC-V (RV64) system. The page tables in an SV32 implementation of the RV32 system consist of $2^{10}$ page-table entries (PTEs), each of four bytes. A page table maybe of the size of a page and aligned to a page boundary. The physical page number of the page table is stored in a register. In the RV64 system, the supervisor mode may be implemented in different ways. The different implementations may include Sv39, Sv48 and Sv56 implementation. Each implementation may have different PTE formats. Sv39 implementation supports a 39 bit virtual address space divided into 4 KiB pages.

FIG. 2F illustrates the format of the page table entry (PTE) 230 in an Sv32 implementation in a RV32 system. The first 8 bits numbered 0 to 7 are assigned particular memory attributes. The 0th bit is a V bit indicating whether the PTE is valid. If the V bit is 0, then all other bits in the PTE are not considered as significant and may be used freely by software. The bits 1-3 are labelled as R, W, and X. The R, W, and X bits are permission bits indicating whether the page is readable (R), writable (W), and executable (X), respectively. The R, W, and X bits can have different combinations and can have different meanings. For example, when R=1 and W and X=0, it means the page is read-only. When all three bits 1-3 are zero, the PTE is a pointer to the next level of the page table. Writable pages must also be marked readable. The 4th bit is a U bit indicating whether the page is accessible to user mode (U). The 5th bit is a G bit designating a global mapping (G). Further 6th and 7th bit are an A bit and D bit representing an accessed (A) and dirty (D) bit. The A bit indicates the virtual page has been read, written, or fetched from since the last time the A bit was cleared. The D bit indicates the virtual page has been written since the last time the D bit was cleared. The next 2 bits (i.e. the 8th bit and the $9^{th}$ bit) are Reserved (RSW) bits. The RSW field is reserved for use by supervisor software and cannot be used by the implementation. The remaining 22 bits (10-31) are used to store the 22 bit PPN as illustrated by the FIG. 2E.

FIG. 2G illustrates the format of the page table entry (PTE) 240 in an Sv39 implementation in a RV64 system. The first 10 bits numbered 0 to 9 are the same as the first 10 bits of the RV32 system shown in FIG. 2F. The next 44 bits (10-53) are used to store the 44 bit PPN. The bits 54-63 are reserved for future use and must be zeroed by software for forward compatibility. In an open ISA such as the RV64 system, the reserved bits 54-63 in the PTE 440 could be used by particular implementations (at the potential expense of forward compatibility) to introduce some of the desired memory attributes otherwise absent from the standard, whilst maintaining the remaining bits in accordance with the format fixed by the standard.

But in examples of open standard ISA's such as the RV32 system, explained with reference to FIG. 2F, where the format of PTE 230 is fixed, there are no bits for storing some of the desired memory attributes. In other words, for open standard ISA's such as RV32 system where each PTE comprises a predetermined number of bits which are all utilised, it is not possible to modify the format of the PTE to store some of the desired attributes without breaking compatibility with the standard. Some of the desired attributes for the RV32 system may include cacheability, speculation, write combination, idempotency, Security info (e.g. trusted/non-trusted), ASID (address space ID), VMID (virtual machine ID) and the like. Even in the RV64 bit system, using the reserved bits to modify the format of the PTE may not be an option if forward compatibility is essential.

Typically, the computer system accesses the memory attributes while accessing the physical address. However, if the desired memory attributes are not included in the page table entry and if the format of the page table entry is not redefinable, then additionally desired memory attributes could be stored in some other location in the memory. However, in order to access these desired memory attributes, separate load and store instructions would need to be executed, which would reduce the performance of the processor in the computer system.

The inventors devised an optimized method for accessing additionally desired memory attributes in such cases. The inventors found that if the desired memory attributes are stored separately in a separate 'shadow' page table and the position of each page table entry in the shadow page table is mapped to a page table entry in the an original page table in a pre-determined manner, then the processor can be enabled to access the desired memory attributes of the memory page while accessing a physical address in the page table entry in the original page table in an optimized manner. In other words, each page table entry in a separate shadow page table can be used to extend the bit length of each page table entry in the original page table. In such a case, the unit performing the address translation can be enabled to walk through both the page tables consecutively and access one or more of the additional characteristics from the shadow table while accessing the address translation. The system and method of achieving this is explained in detail below.

Figure 4:
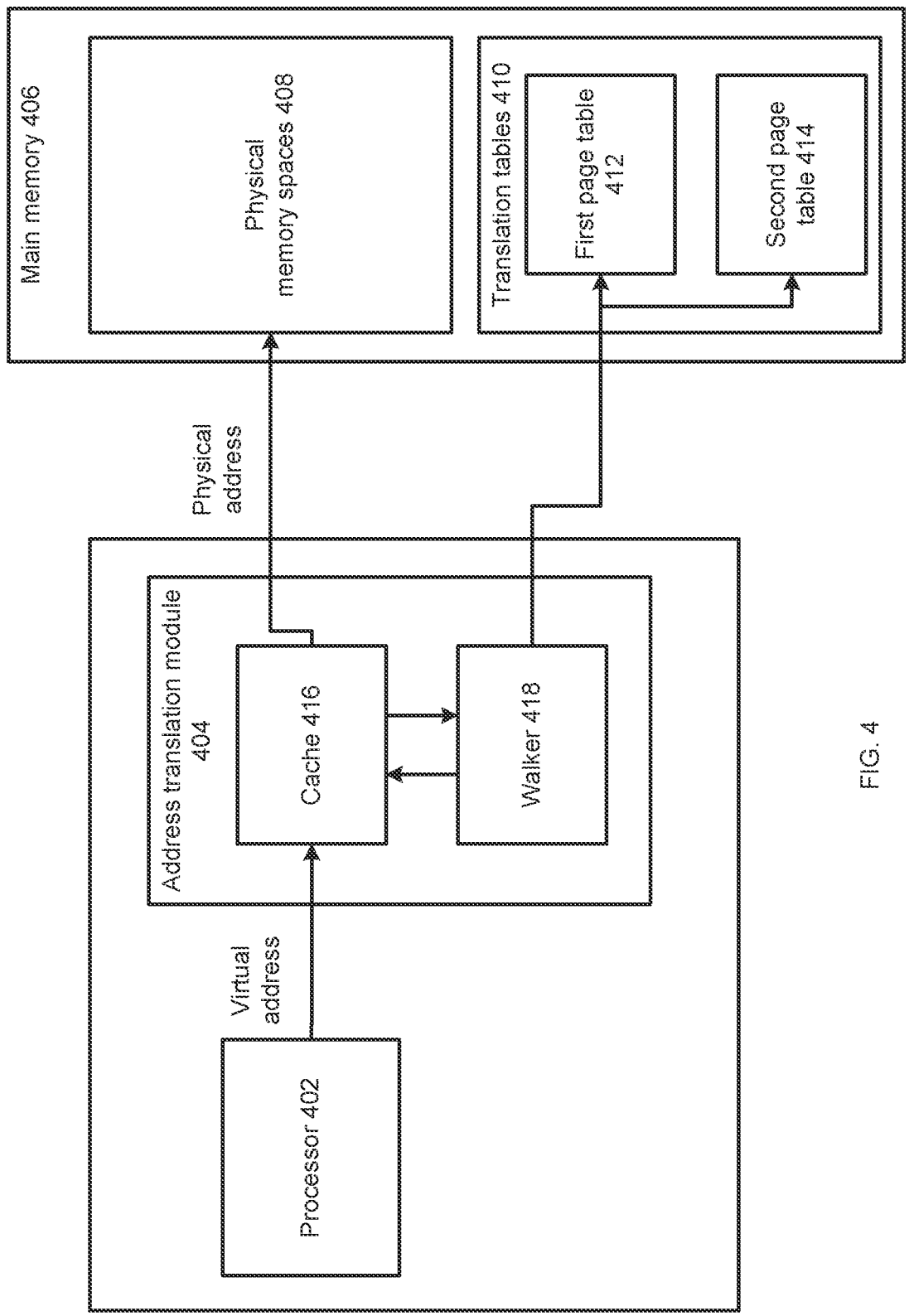
FIG. 4 is a block diagram a computer system with an extended page table.

FIG. 4 is a block diagram of a computer system 400 with an extended page table. The computer system 400 comprises the processor 402, and the main memory 406. The processor comprises an address translation module 404 implemented using hardware, software or a combination thereof. The processor 402 may be any processor such as OpenRISC®, SPARC®, RISC-V®, MIPS® and the like. In one example, the processor is a 32-bit RISC-V processor.

The main memory 406 comprises physical memory spaces 408 comprising blocks of memory allocated for various purposes. The physical memory spaces 408 may be divided into groups of bytes known as pages as described earlier. The main memory 406 also comprises a memory portion allocated to translation tables 410. The memory portion allocated to the translation tables may include at least two page tables. In FIG. 4, the memory portion allocated to translation tables 410 stores a first page table 412 and a second page table 414. There could be more than two page tables stored in the main memory 406.

Figure 5:
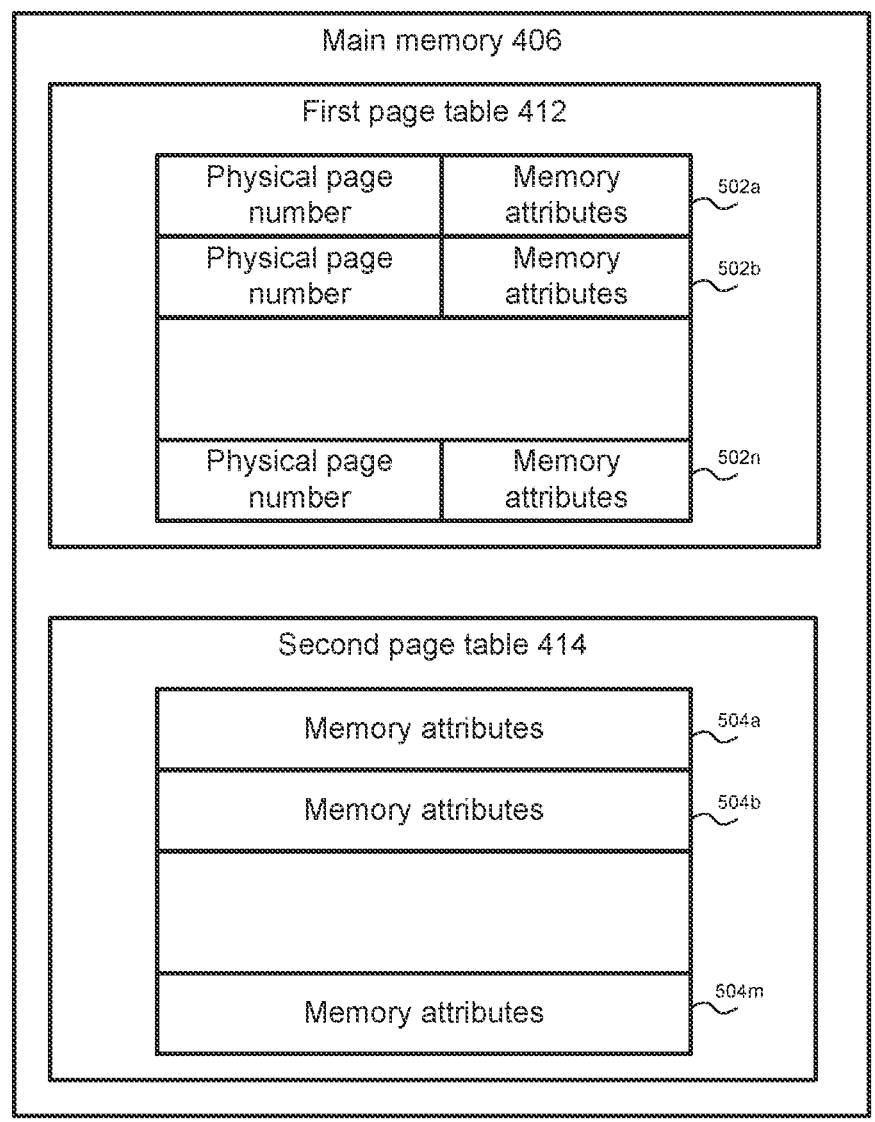
FIG. 5 illustrates a first page table and a second page table stored in the main memory.

FIG. 5 illustrates a first page table 412 and a second page table 414 stored in the main memory 406. In a 32-bit system, each entry may have a bit length of 32 bits. The first page table 412 comprises a plurality of primary page table entries 502a, 502b . . . 502n. The format of primary page table entries is similar to the format of the PTE illustrated by FIG. 2F. Each primary page table entry has a bit length of 32 bits. Each page table entry among the primary page table entries is configured to store a physical page number which maps a virtual memory address to a physical memory address and auxiliary information. The auxiliary information comprises one or more memory attributes. Each primary page table entry in the first page table comprises a predetermined number of bits which are all utilised.

Similarly, the second page table 414 comprises a plurality of secondary page table entries 504a, 504b . . . 504m. As mentioned above, in a 32-bit system the memory is addressed in units 32 bits long. In FIG. 5, each secondary page table entry among the plurality of secondary page table entries 504a, 504b . . . 504m is shown as having a bit length of 32 bits. However, the plurality of secondary page table entries may have any bit length. For example, the plurality of secondary page table entries may be 8 bits or 16 bits or 48 bits etc. When the plurality of secondary page table entries 504a, 504b . . . 504m are 16 bits, then two secondary page table entries may be stored in a 32 bit unit of memory. Each secondary page table entry is designed to extend the bit length of a corresponding primary page table entry in the first page table. Each of the secondary page table entries stores at least one auxiliary information i.e. at least one further memory attribute for a corresponding primary page table entry in the first page table. In other words, a corresponding primary page table entry and secondary page table entry relate to the same mapping of a virtual memory address to a physical memory address, and the further memory attributes stored in the secondary page table entry are different from the memory attributes stored in the primary page table entry. Thus, the second page table stores extra memory attributes (which are not in the first page table), associated with a particular mapping of a virtual memory address to a physical memory address, when the primary page table entries in the first page table is full (i.e. all the bits of the primary page table entries are utilized).

Each secondary page table entry in the second page table corresponds to a primary page table entry in the first page table. That is, there is a one-to-one mapping between each secondary page table entry and the corresponding primary page table entry. The second page table 414 may be stored at an offset from the first page table 412. Each secondary page table entry in the second page table may be stored in the physical memory at a pre-determined offset from the corresponding primary page table entry. Each secondary page table entry in the second page table may be of the same size (i.e. having the same bit length) or a different size (i.e. having a different bit length) compared to the corresponding primary page table entry.

The processor 402 accesses a main memory 406 via the address translation module 404. The address translation module 404 in an example is a memory management unit (MMU). The address translation module 404 comprises a cache 416 for storing the most recently used memory translations. The cache in one example could be a TLB. The cache is a different memory compared to the physical memory of the computer system. Therefore, the cache (TLB) is stored in a memory different from the physical memory where the translation tables 410 such as first and second page tables are stored. As discussed above it will be evident to a person skilled in the art that the cache (TLB) comprising page table entries is different to a page table. The processor sends a request for a physical address to the address translation module 404. The request may be a virtual address as shown in FIG. 2D.

Figure 6:
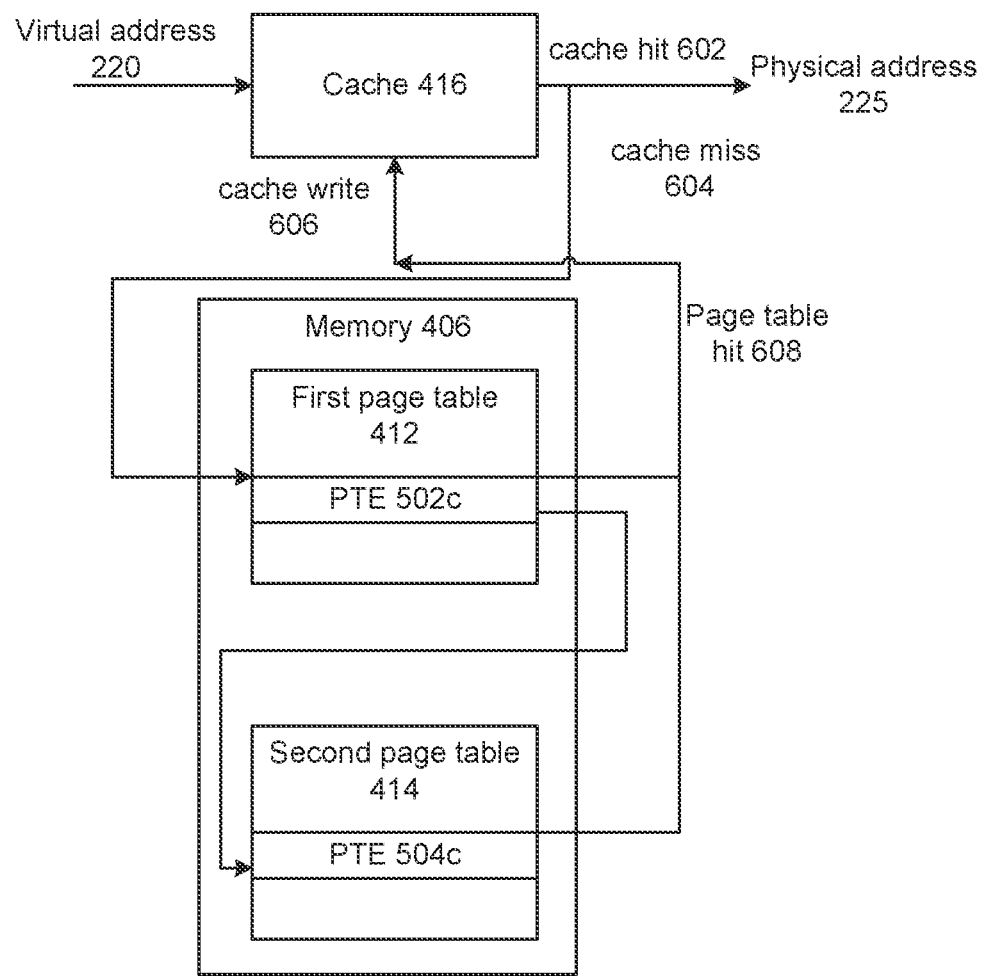
FIG. 6 shows the working of the address translation module accessing an extended page table.

FIG. 6 shows the working of the address translation module 404. The address translation module 404, on receiving the request, searches in the cache 416, for valid address translation from the virtual address to a physical address. The cache 416 contains a plurality of recent address translations that have occurred. On identifying a valid address translation in the cache 416, known as a cache hit 602, the address translation module provides the corresponding physical address to the processor 402. The processor 402 uses the physical address from the cache to access data at a location in the physical memory spaces 408 in the main memory 406. In some cases, in the absence of the valid address translation in the cache, the address translation module invokes a cache miss 604. The invoking of the cache miss is the same as the invoking of TLB miss as explained in detail with reference to FIG. 3.

The invoking of the cache miss 604 may be handled by the address translation module 404 by using a hardware unit or software or a combination of both. The invoking of the cache miss may be handled by using a hardware unit such as a page table walker 418 as shown in FIG. 4 or by raising a software exception handler. As before, for the sake of simplicity, below, the description refers to a 'page table walker' and 'walking' the page table, but it will be understood that these features could be implemented by a software exception handler too.

On receiving the request from the processor 402, when a cache miss 604 is invoked, the page table walker 418 in the address translation module 404 walks through the first page table 412 to retrieve a primary page table entry and to consecutively retrieve a corresponding secondary page table entry from the second page table 414. In examples where there are more than two page tables among the translation tables 410 stored in the main memory, the page table walker 418 walks through the first page table to retrieve a primary page table entry and to consecutively retrieve a corresponding page table entry from each of the one or more remaining page tables among the translation tables 410.

The page table walker 418 walks through the first page table to retrieve a valid primary page table entry (as an example 502c) that maps the virtual address to a physical address and contains associated memory attributes of the memory space identified by the physical address. Further, once the primary page table entry 502c is identified or located, the page table walker 418 consecutively identifies the location of the corresponding secondary page table entry 504c to identify at least one further memory attribute. The further memory attributes stored in a secondary page table entry of second page table are extra, different, memory attributes from the memory attributes stored in the corresponding primary page table entry in the first page table. The page table walker 418 is configured to calculate the location of the corresponding secondary page table entry 504c based on the location of the valid primary page table entry 502c in the first page table. The location of the primary page table entry and the location of the corresponding secondary page table entry have a predetermined relationship with each other. Once the location of the primary page table entry 502c and the secondary page table entry 504c is identified, the page table walker retrieves the primary page table entry 502c and the secondary page table entry 504c to obtain the physical address and desired associated memory attributes of the memory space. Once identified, the primary page table entry 502c and the secondary page table entry 504c may be retrieved in any order There can be various methods or logics for relating the location of the corresponding secondary page table entry to the location of the valid primary page table entry in the first page table, which may differ based on the location of the second page table with respect to the first page table and the size of the second page table compared to the first page table. The location of the secondary page table entry is determined by the address translation module 404. More specifically, the location of the secondary page table entry is determined by the page table walker 418 or the software exception handler.

As discussed earlier, the second page table may be stored at an offset from the first page table. In some cases, the offset could be zero, which means the second page table 414 is stored in the main memory 406 at a location physically contiguous to the first page table 412. In some other cases the second page table 414 may be stored at a particular non-zero offset from the first page table i.e. the second page table 414 is stored in the main memory 406 at a location that is not physically contiguous to the first page table 412. Similarly, in some cases the two page tables may have the same size, and in others they may have different sizes. As explained in more detail below, whatever the combination of these possibilities, each secondary page table entry in the second page table is stored in the physical memory at a pre-determined offset from the corresponding primary page table entry.

In a first implementation, the second page table 414 may be of the same size as the first page table and the second page table may be physically contiguous to the first page table or vice versa. In other words, having the same size means each secondary page table entry has the same bit length as the corresponding primary page table entry. In this case, the predetermined offset for calculating the location of the secondary page table entry would be a predetermined fixed offset. In other words, while calculating the secondary page table entry corresponding to a primary page table entry, the address translation module adds a predetermined fixed offset to the address of the primary page table entry to identify the location and retrieve the secondary page table entry. Put another way, the predetermined offset is fixed irrespective of which entry in the first page table is being considered. The predetermined fixed offset may also be a signed number. This is because the second page table 414 may be of the same size as the first page table. The predetermined fixed offset may be a negative number in case the secondary page table is located at a lower address than the primary page table.

For example, consider the length of both the first page table 412 and the second page table 414 is 4 KiB, and the second page table is at a location physically contiguous to the first page table 412. In such case, when the address translation module 404 finds a valid primary page table entry in the first page table, then the address of the secondary page table entry can be calculated by adding 4 KiB to the address of the corresponding primary page table entry. More generally, in this scenario, the address or location of the secondary page table entry (SPTE) is obtained by $$\text{SPTE address} = \text{PPTE address} + \text{offset}_1$$

where PPTE address is the address of primary page table entry and $\text{offset}_1$ is the size of the first page table (which in this case is the same as the size of the second page table). In the example explained above, $\text{offset}_1$ is 4 KiB.

In another example, consider the length of both the first page table 412 and the second page table 414 is the same (say 4 KiB), and the first page table is at a location physically contiguous to the second page table 414. In other words, the secondary page table could be located at a lower address than the primary page table. In such case, when the address translation module 404 finds a valid primary page table entry in the first page table, then the address of the secondary page table entry can be calculated by adding a negative predetermined fixed offset (i.e. −4 KiB) to the address of the corresponding primary page table entry (or in other words subtracting the predetermined offset from the address of the corresponding primary page table entry). The address or location of the secondary page table entry (SPTE) in this example is obtained by $$\text{SPTE address} = \text{PPTE address} + (-\text{offset}_1)$$

where PPTE address is the address of primary page table entry and offset, is the size of the second page table (which in this case is the same as the size of the first page table).

In a second implementation, the second page table 414 may be of the same size as the first page table 412, and the second page table 414 may be physically not contiguous from the first page table or vice versa. The second page table 414 being stored physically not contiguous from the first page table 412 means that the second page table is stored away from the first page table. This means either the second page table is stored at a relatively small offset (of say 2 KiB or 4 KiB) from the first page table or may be stored in a different memory portion with a large offset or even in different memories. In this case, the offset between the two tables is the amount of memory between the end of one page table (e.g. the first page table, although this need not be the case) and the start of the other (following the example, the secondary page table). In this situation there is still a fixed predetermined offset for calculating the location of the secondary page table entry from the location of the corresponding primary page table entry. Compared to the first implementation, however, the offset between corresponding page table entries is not just equivalent to the length of the first page table (being the same as the length of the second page table); it is equivalent to the sum of the length of the first page table (still being the same as the length of the second page table) and the offset between the two page tables. In other words, while calculating the secondary page table entry corresponding to a primary page table entry, the address translation module adds a predetermined fixed offset to the address of the primary page table entry to identify the location and retrieve the secondary page table entry. The predetermined fixed offset may also be a signed number as explained earlier. The predetermined fixed offset may be a negative number, in case the secondary page table is located at a lower address than the primary page table.

For example, if the offset of the start of the second page table from the end of the first page table is known, then this offset can be used in combination with the size of the first page table (being the same as the size of the second page table) to calculate the location of the secondary page table entry. The size of this combined offset may be stored in a register. In such a case, the address or location of the secondary page table entry is obtained by $$\text{SPTE address} = \text{PPTE address} + \text{offset}_2$$

$$= \text{PPTE address} + \text{offset}_1 + \text{offset between tables}$$

In other words, here, $\text{offset}_2 = \text{offset}_1 + $ the offset between tables. So, if the page tables are each 4 KiB, and the amount of memory between the two tables is 2 KiB, then $\text{offset}_2$ is 6 KiB.

The same equation can be used for the first implementation where the first page table 412 is of the same size as the second page table, and the second page table is physically contiguous to the first page table.

In another example, second page table 414 maybe located at a lower address than the primary page table. In such a case, if the offset of the start of the first page table from the end of the second page table is known, then this offset can be used in combination with the size of the second page table (being the same as the size of the first page table) to calculate the location of the secondary page table entry. The address or location of the secondary page table entry (SPTE) in this example is obtained by $$\text{SPTE address} = \text{PPTE address} + (-\text{offset}_2)$$

$$= \text{PPTE address} - (\text{offset}_1 + \text{offset between tables})$$

In other words, here, $\text{offset}_2 = \text{offset}_1 + $ the offset between tables. So, if the page tables are each 4 KiB, and the amount of memory between the two tables is 2 KiB, then $\text{offset}_2$ is 6 KiB.

It is also possible to perform the calculations of the first and second implementations in a different way. In both cases, as the page table entries in the different tables have the same length, if the start of address of each table is known, then the difference between the start of the first page table and the primary table entry location will be the same as the difference between the start of the second page table and the secondary page table entry. For example, $$\text{SPTE address} = \text{Second PT start address} + (\text{PPTE address} - \text{First PT start address})$$

where "Second PT start address" is the start address of the second page table 414 and "First PT start address" is the start address of the first page table.

To assist with this calculation, the start addresses of the first and second page tables may each be stored in a register. In any case, viewing the first and second implementations in this way, calculations are different, each secondary page table entry is still stored in the physical memory at a pre-determined fixed offset from the corresponding primary page table entry.

In a third implementation, the second page table 414 may be of a different size compared to the first page table 412 and the second page table may be physically contiguous to the first page table. In other words, all the secondary page table entries have the same bit length, but that bit length is a different bit length compared to the primary page table entries, resulting in a differently sized page table. In such a case, the predetermined offset would be a predetermined variable offset. When the predetermined offset is a predetermined variable offset, each secondary page table entry is stored in the physical memory at a different offset from their corresponding primary page table entries, but the locations of secondary page table entries are still predetermined by the size of the first page table and the size of the secondary page table entries. In other words, the location of a secondary page table entry can be derived by a mathematical equation if the primary page table entry location is known.

The third implementation may have a further two options, the first option being that the secondary page table entry is smaller in size compared to the primary page table entry and the second option being that the secondary page table entry is larger in size compared to the primary page table entry.

Consider the first option where the secondary page table entry is smaller in size compared to the primary page table entry. For example, consider the length of first page table to be 4 KiB with each primary page table entry being 32 bits and the second page table being 2 KiB with each secondary page table entry being 16 bits. In this case, when the address translation module finds a primary page table entry in the first page table, then the address of each secondary page table entry can be calculated by adding a variable offset, calculated based on a predetermined equation, to the address of the corresponding primary page table entry or to the start address of the second page table. In this case the equation is:

SPTE address=PPTE address+$offset_3$ where $offset_3 = offset_1 - (PPTE\ size - SPTE\ size)*(PPTE\ address - First\ PT\ start\ address)/PPTE\ size$ and where PPTE size is the length of the primary page table entry (being the same for each page table entry in the first page table), and SPTE size is the length of the secondary page table entry (being the same for each page table entry in the second page table). Thus, when the PPTE is the first entry in the first page table, $offset_3 = offset_1 =$ the length of the first page table=4 KiB in the example, as expected (because the corresponding SPTE is the first entry in the second page table). Considering the next pair of corresponding page table entries (i.e. the second entry in each table), $offset_3$ will be smaller because the first entry in the second table is shorter than the entries in the first table. In this case, compared to the first pair of entries, $offset_3$ will be 16 bits shorter than 4 KiB (16 bits being the difference in size between one entry of each table). Similarly, the third pair of entries will have an offset 32 bits shorter than 4 KiB (being twice the difference in size between the page table entries), and so on.

By reducing the size of the second page table, the use of memory can be optimized such that only a few extra bits are used for additional information on memory attributes. However, in such cases, more complex calculation would be required to identify the secondary page table entry as the offset between each primary page table entry to the corresponding secondary page table entry cannot be fixed.

Now, consider the second option where the secondary page table entry is larger in size compared to the primary page table entry. For example, consider that the length of first page table is 4 KiB with each primary page table entry being 32 bits and the second page table is 8 KiB with each secondary page table entry being 64 bits. In another example the second page table may be 6 KiB with each secondary page table entry being 48 bits. In such case, when the address translation module finds a primary page table entry in the first page table, then the address of each secondary page table entry can be calculated by adding a variable offset, calculated based on a predetermined equation, to the address of the corresponding primary page table entry or to the start address of the second page table. In this case the equation is:

SPTE address=PPTE address+$offset_4$ where $offset_4 = offset_1 + (SPTE\ size - PPTE\ size)*(PPTE\ address - First\ PT\ start\ address)/PPTE\ size$ and where PPTE size is the length of the primary page table entry (being the same for each page table entry in the first page table), and SPTE size is the length of the secondary page table entry (being the same for each page table entry in the second page table).

A second page table with a larger size may be preferred only when that additional size is necessary to store the desired attributes, e.g. when for an RV32 system more than 32 bits are required to store additional information on memory attributes. Again, in this case, a more complex calculation would be required to identify the secondary page table entry.

In both the first and second options in the third implementation, in other examples, the second page table may be located before the first page table and the skilled person will understand how to modify the preceding equations.

In a fourth implementation, the second page table 414 may be of a different size compared to the first page table 412 and the second page table 414 may be physically not contiguous to the first page table 412. In other words, all the secondary page table entries have the same bit length, but that bit length is a different bit length compared to the primary page table entries, resulting in a differently sized page table. Also, the second page table 414 being stored physically not contiguous from the first page table 412 means that the second page table is stored away from the first page table. As described earlier with respect to the second implementation, this means either the second page table is stored at a relatively small offset from the first page table or may be stored in a different memory portion with a large offset or even in different memories.

In such a case, the predetermined offset would be a predetermined variable offset i.e. each secondary page table entry is stored in the physical memory at a different offset from their corresponding primary page table entries, but the locations of secondary page table entries are still predetermined by the size of the first page table, the size of the secondary page table entries and the offset of the second page table from the first page table. In other words, the location of a secondary page table entry can be derived by a mathematical equation if the primary page table entry location is known.

The fourth implementation may have a further two options, the first option being that the secondary page table entry is smaller in size compared to the primary page table entry and the second page table is physically not contiguous to the first page table, and the second option being that the secondary page table entry is larger in size compared to the primary page table entry and the second page table is physically not contiguous to the first page table.

Consider the first option where the secondary page table entry is smaller in size compared to the primary page table entry and the second page table is physically not contiguous to the first page table. For example, consider the length of first page table to be 4 KiB with each primary page table entry being 32 bits and the second page table being 2 KiB with each secondary page table entry being 16 bits. In this case, when the address translation module finds a primary page table entry in the first page table, then the address of each secondary page table entry can be calculated by adding a variable offset, calculated based on a predetermined equation. In this case the equation is:

$$\text{SPTE address} = \text{PPTE address} + \text{offset}_5$$

where $\text{offset}_5 = \text{offset}_2 - (\text{PPTE size} - \text{SPTE size}) * (\text{PPTE address} - \text{First PT start address}) / \text{PPTE size}$ and where PPTE size is the length of the primary page table entry (being the same for each page table entry in the first page table), SPTE size is the length of the secondary page table entry (being the same for each page table entry in the second page table), and $\text{offset}_2$=the offset between page tables+$\text{offset}_1$ (i.e. the length of the first page table).

Now, consider the second option where the secondary page table entry is larger in size compared to the primary page table entry and the second page table is physically not contiguous to the first page table. For example, consider that the length of first page table is 4 KiB with each primary page table entry being 32 bits and the second page table is 8 KiB with each secondary page table entry being 64 bits. In such case, when the address translation module finds a primary page table entry in the first page table, then the address of each secondary page table entry can be calculated by adding a variable offset, calculated based on a predetermined equation. In this case the equation is:

$$\text{SPTE address} = \text{PPTE address} + \text{offset}_6$$

where $\text{offset}_6 = \text{offset}_2 + (\text{SPTE size} - \text{PPTE size}) * (\text{PPTE address} - \text{First PT start address}) / \text{PPTE size}$ and where PPTE size is the length of the primary page table entry (being the same for each page table entry in the first page table), SPTE size is the length of the secondary page table entry (being the same for each page table entry in the second page table), and $\text{offset}_2$=$\text{offset}_1$+the offset between tables.

In both the first and second options in the fourth implementation, in other examples, the second page table may be located before the first page table and the skilled person will understand how to modify the preceding equations.

The above given implementations are examples, and it would be known to a person skilled in the art that that other similar equations or calculation may be used to identify the address of the secondary page table entry.

Thus, the page table walker 418 in the address translation module 404 is configured to, in response to receiving a request from the processor, walk through the first page table 412 to retrieve a primary page table entry and consecutively retrieve a corresponding secondary page table entry from the second page table 414. The identification of the primary page table entry and the secondary page table entry causes a page table hit 608. The page table walker, on accessing a primary page table entry from the first page table 412, can identify the address of the corresponding secondary page table entry, from the address of the primary table entry, to consecutively retrieve the corresponding secondary page table entry.

As mentioned above, when the address translation module is implemented by the software, all the above functions explained with respect to the address translation module may be implemented using software. In this case, the cache miss 604 or the TLB miss is handled by a software exception handler. The operating system provides a virtual address to the address translation module 404. The address translation module checks the cache 416 to check if the address translation is present or if there is a cache hit 602. If the required address translation is not present, then a cache miss 604 is invoked.

The software exception handler then walks through the first page table 412 to retrieve a primary page table entry and consecutively retrieve a corresponding secondary page table entry from the second page table 414. The software exception handler, on accessing a primary page table entry from the first page table 412, uses the address of the primary page table entry to determine the address of the corresponding secondary page table entry to consecutively retrieve the corresponding secondary page table entry. The calculations or logics used may be same as the ones described above.

Once the primary page table entry and the corresponding secondary page table entry is retrieved from the translation tables 410, the primary page table entry and the corresponding secondary page table entry are copied to the cache 416. This is known as cache write 606. The width of the cache (TLB) 416 is modified, compared to a conventional system in which there is no second page table, such that one entry in the TLB can hold both the primary page table entry and the corresponding secondary page table entry. The information stored in the page tables and the cache could be in the same or different format.

To optimize the working of the computer system, some hardware units or hardware control can be set up to check if the second page table entry from a second page table needs to be accessed while accessing a primary page table. Typically, when a system is running, all the requests for accessing the page table would be of the same type. However, it is possible for a system to decide, e.g. while executing a booting software, if the information in the primary page table entry in the first page table would be sufficient for all the applications or if the additional information in the secondary page table entry of the second page table is required. Based on the decision the hardware page table walker or the software can be configured to access the information in the secondary page table entry of the second page table.

Figure 7:
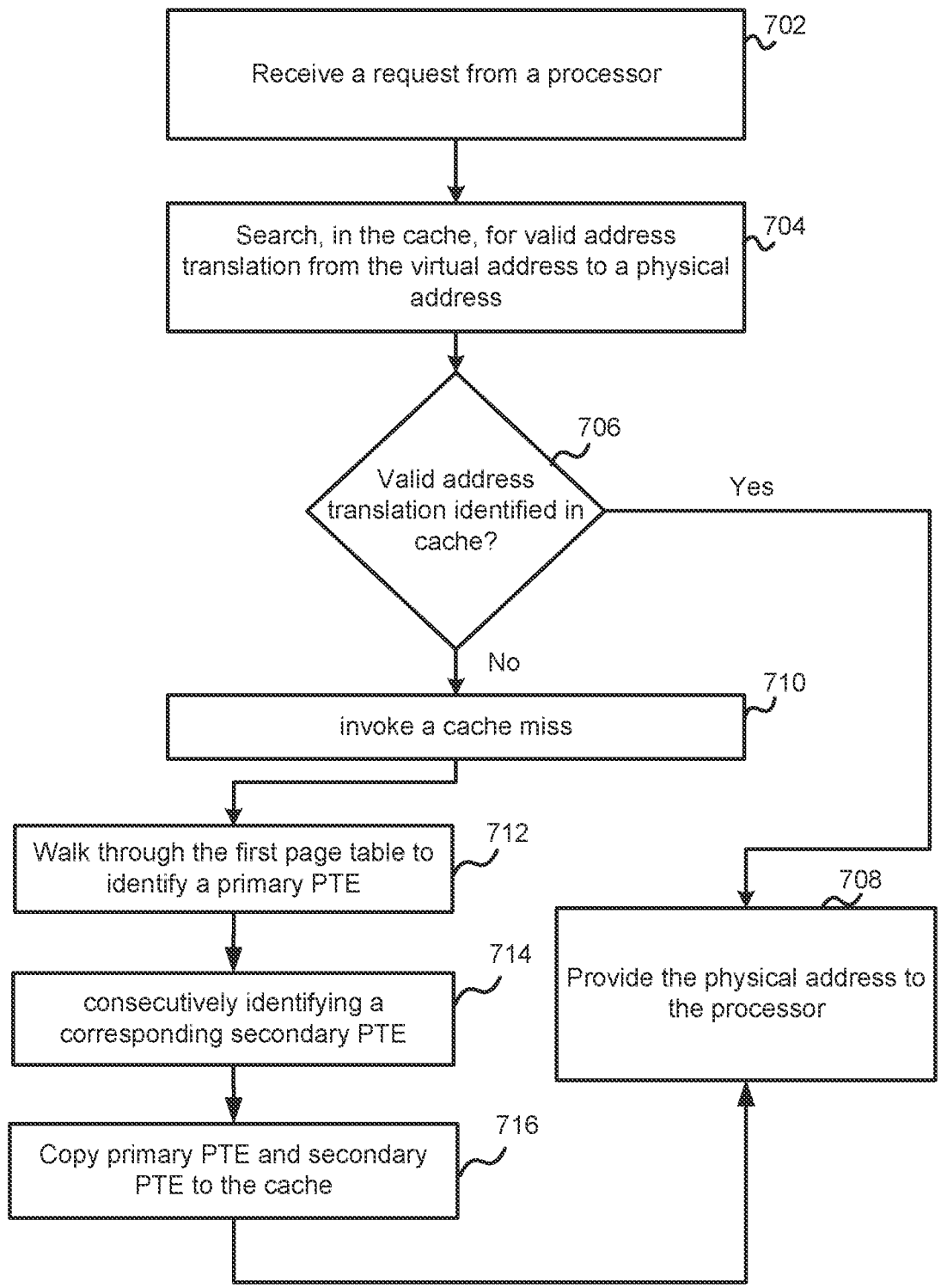
FIG. 7 is a flowchart explaining the working of the address translation module in the computer system 400.

FIG. 7 is a flowchart explaining the working of the address translation module in the computer system 400. As discussed with reference to FIG. 4-6, the address translation module performs a computer-implemented method for translating a virtual address to a physical address.

At step 702, the method includes receiving a request from a processor in the computer system. The request is a virtual address as shown in FIG. 2D or FIG. 2A. The computer system comprises an address translation unit for translating virtual address received to a physical address. The computer system comprises a physical memory comprising at least a first page table comprising primary page table entries and a second page table comprising secondary page table entries. Each secondary page table entry corresponds to a primary page table entry in the first page table and is stored in the physical memory at a pre-determined offset from the corresponding primary page table entry. That is, there is a one to one mapping between a secondary page table entry in the second page table and a primary page table entry in the first page table.

At step 704, the method includes searching, in the cache, for a valid address translation from the virtual address to a physical address. The cache stores a plurality of address translations recently occurred in the memory. The cache in one example is a Translation Lookaside Buffer (TLB).

At step 706, it is determined if the valid address translation is found in the cache. If the determination is Yes' that is a valid address translation is found, then at step 708, the physical address is provided to the processor.

If the determination is 'No', that is the valid address translation is not found, a cache miss is invoked at step 710. Invoking the cache miss invokes a page table walker or a software exception handler in the address translation unit to handle the cache miss.

When the cache miss is invoked, at step 712, the method includes walking through the first page table to identify and access a valid primary page table entry by the page table walker. The primary page table entry comprises a first number of bits representing a physical page number (PPN) and a second number of bits representing some auxiliary information. The valid primary page table entry is obtained if the virtual page number (VPN) in the virtual address is mapped with the physical page number (PPN) in the primary page table entry. On accessing the primary page table entry, the auxiliary information such as a plurality of memory attributes are also obtained.

The method, at step 714, further includes consecutively identifying a corresponding secondary page table entry from the second page table to identify at least one further desired memory attribute. The secondary page table entry comprises a plurality of desired memory attributes. On identifying a primary page table entry from the first page table 412, the page table walker calculates the address of the corresponding secondary page table entry to consecutively identify the corresponding secondary page table entry. Different logic or equations can be used for calculating the corresponding secondary page table entry as discussed earlier. Once the primary and secondary page table entries are identified, they can be retrieved in any order.

At step 716, the retrieved primary and secondary page table entry are copied to the cache. The format of information stored in the cache and the page tables may be different. In such case, the format of the primary and secondary page table entries are converted to the format of entries in the cache. From the retrieved primary page table entry, the physical address corresponding to the received virtual address is provided to the processor (708).

Figure 8:
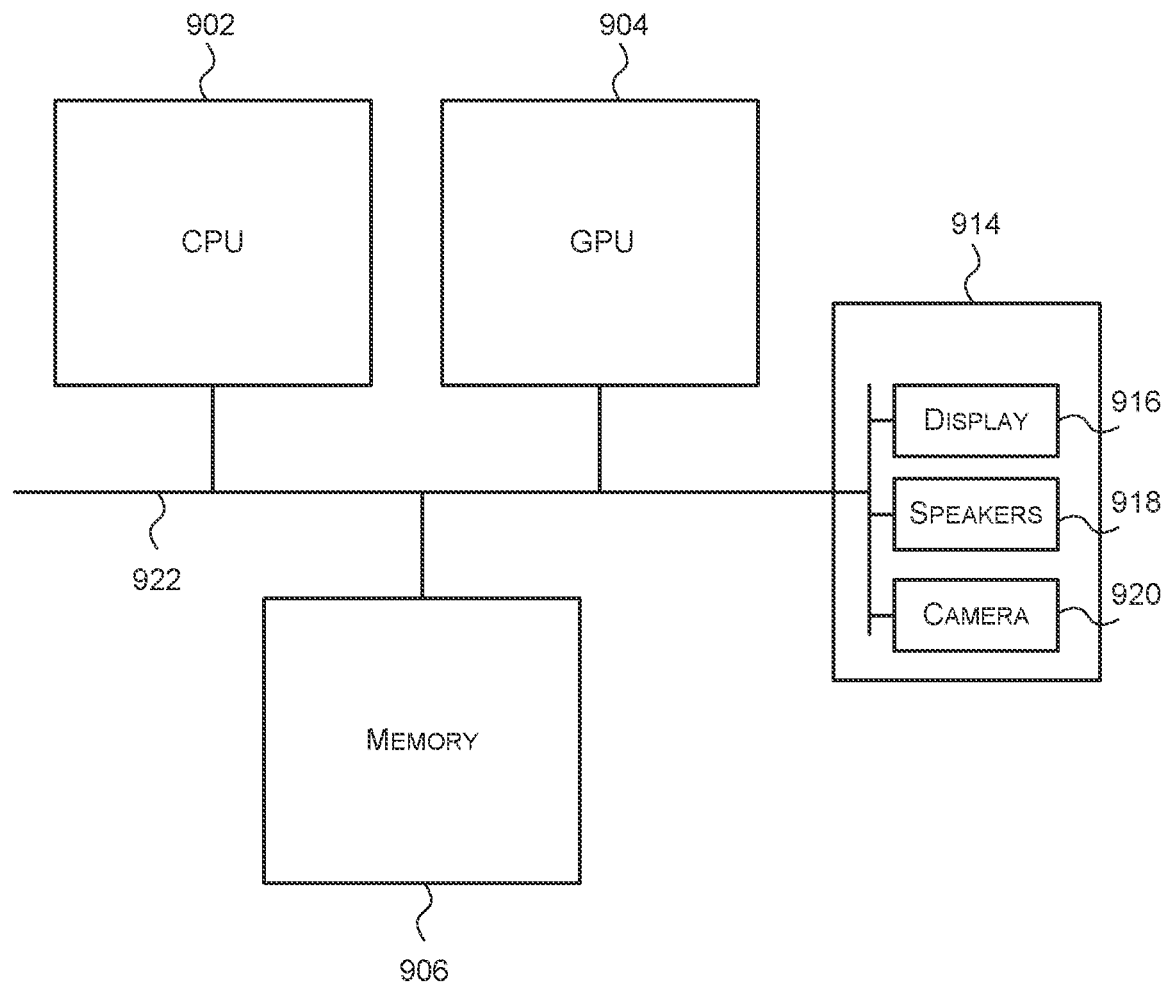
FIG. 8 shows a computer system.

FIG. 8 shows a computer system comprising a CPU 902, a GPU 904, a memory 906 and other devices 914, such as a display 916, speakers 918 and a camera 922. The components of the computer system can communicate with each other via a communications bus 920.

While FIG. 8 illustrates one implementation of a computer system, it will be understood that a similar block diagram could be drawn for an artificial intelligence accelerator system—for example, by replacing either the GPU 904 with a Neural Network Accelerator (NNA) 911, or by adding the NNA as a separate unit.

The computer system 400 of FIG. 4 are shown as comprising a number of functional blocks. This is schematic only and is not intended to define a strict division between different logic elements of such entities. Each functional block may be provided in any suitable manner. It is to be understood that intermediate values described herein as being formed by a computer system need not be physically generated by the computer system at any point and may merely represent logical values which conveniently describe the processing performed by the computer system between its input and output.

The computer system described herein may be embodied in hardware on an integrated circuit. The computer system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a computer system 400 configured to perform any of the methods described herein, or to manufacture a computer system 400 comprising any apparatus described herein. An integrated circuit definition dataset may be, for example, an integrated circuit description.

Therefore, there may be provided a method of manufacturing, at an integrated circuit manufacturing system, a computer system 400 as described herein. Furthermore, there may be provided an integrated circuit definition dataset that, when processed in an integrated circuit manufacturing system, causes the method of manufacturing a computer system 400 to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a computer system will now be described with respect to FIG. 9.

Figure 9:
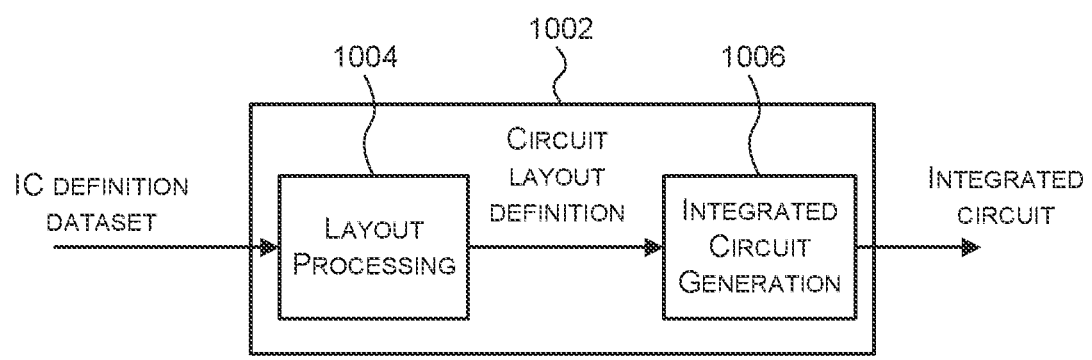
FIG. 9 shows an integrated circuit manufacturing system for generating an integrated circuit embodying a computer system.

FIG. 9 shows an example of an integrated circuit (IC) manufacturing system 1002 which is configured to manufacture a computer system 400 as described in any of the examples herein. In particular, the manufacturing system 1002 comprises a layout processing system 1004 and an integrated circuit generation system 1006. The IC manufacturing system 1002 is configured to receive an IC definition dataset (e.g. defining a computer system as described in any of the examples herein), process the IC definition dataset, and generate an IC according to the IC definition dataset (e.g. which embodies a computer system as described in any of the examples herein). The processing of the IC definition dataset configures the IC manufacturing system 1002 to manufacture an integrated circuit embodying a computer system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a computer system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer implemented method performed by an address translation unit in a computer system, the computer system comprising a physical memory including a first page table having primary page table entries and a second page table having secondary page table entries, each of the secondary page table entries corresponding to a respective primary page table entry in the first page table, the computer implemented method comprising:
   receiving a request from a processor;
   walking through the first page table to identify both a primary page table entry and a location of the primary page table entry within the first page table; and
   consecutively identifying a location of a corresponding secondary page table entry of the secondary page table entries, by adding a predetermined offset to the location of the primary page table entry.

2. The computer implemented method as claimed in claim 1, wherein the method further comprises retrieving the primary page table entry and the secondary page table entry.

3. The computer implemented method as claimed in claim 1, wherein the method further comprises storing a plurality of address translations, each from a virtual memory address to a physical memory address in a cache and wherein the method further comprises, on receiving the request from the processor, where the request is a virtual address:
   searching, in the cache, for valid address translation from the virtual address to a physical address;
   providing the physical address to the processor, on identifying the valid address translation for the virtual address in the cache; and
   invoking a cache miss, in an absence of the valid address translation in the cache.

4. The computer implemented method as claimed in claim 3, wherein the method further comprises walking through the first page table to identify the primary page table entry comprising a mapping of a physical address to the virtual address, on the occurrence of the cache miss.

5. A non-transitory computer readable storage medium having stored thereon computer readable code configured to cause, when the code is run, a computer system comprising a physical memory including a first page table having primary page table entries and a second page table having secondary page table entries, each of the secondary page table entries corresponding to a respective primary page table entry in the first page table, to perform a method comprising:
   receiving a request from a processor;
   walking through the first page table to identify both a primary page table entry and a location of the primary page table entry within the first page table; and
   consecutively identifying a location of a corresponding secondary page table entry of secondary page table entries in the second page table, by adding a predetermined offset to the location of the primary page table entry.

6. A computer system, comprising:
   a physical memory having
      a first page table comprising primary page table entries, wherein each page table entry among the primary page table entries is configured to store a mapping of a virtual memory address to a physical memory address and auxiliary information, and
      a second page table comprising secondary page table entries each storing at least one further auxiliary information, wherein each of the secondary page table entries corresponds to a respective primary page table entry in the first page table; and
   an address translation module configured to, in response to receiving a request from a processor, identify both a primary page table entry and a location of the primary page table entry within the first page table and consecutively identify a location of a corresponding secondary page table entry of the secondary page table entries by adding a predetermined offset to the location of the primary page table entry in said first page table.

7. The computer system as claimed in claim 6, wherein the address translation module is further configured to retrieve the primary page table entry and the secondary page table entry, optionally wherein the address translation module further copies the primary page table entry and the corresponding secondary page table entry retrieved into a cache.

8. The computer system as claimed in claim 6, wherein the address translation module comprises a cache configured to store a plurality of address translations, each from a virtual memory address to a physical memory address and optionally the cache is a translation look aside buffer (TLB).

9. The computer system as claimed claim 8, wherein the address translation module on receiving a request, that is a virtual address, is configured to:
   search, in the cache, for valid address translation from the virtual address to a physical address;
   provide the physical address to the processor, on identifying the valid address translation for the virtual address in the cache; and
   invoke a cache miss, in an absence of the valid address translation in the cache, wherein the invoking of the cache miss is handled by the address translation module by using a page table walker or by raising a software exception handler.

10. The computer system as claimed in claim 9, wherein the address translation module walks through the first page table to identify the primary page table entry comprising a mapping of a physical address to the virtual address, on the occurrence of the cache miss.

11. The computer system as claimed in claim 6, wherein the auxiliary information and the further auxiliary information each comprises one or more memory attributes.

12. The computer system as claimed in claim 6, wherein the second page table is stored in the physical memory at a location physically contiguous to the first page table or at a location not physically contiguous to the first page table.

13. The computer system as claimed in claim 6, wherein the second page table is of a same size as the first page table, with the primary and secondary page table entries having the same bit length, or the second page table is of a different size compared to the first page table, with the secondary page table entries having a different bit length compared to the primary page table entries.

14. The computer system as claimed in claim 6, wherein the pre-determined offset is a predetermined fixed offset with each of the secondary page table entries being stored in the physical memory at a fixed same offset from the respective primary page table entry.

15. The computer system as claimed in claim 6, wherein the pre-determined offset is a predetermined variable offset with each secondary page table entry stored in the physical memory at a different offset from the corresponding primary page table entry.

* * * * *